United States Patent
Hui et al.

(10) Patent No.: US 10,383,282 B2
(45) Date of Patent: Aug. 20, 2019

(54) AIRFLOW SYSTEM WITH FAN SPACER FOR WORK VEHICLES

(71) Applicant: CNH Industrial Canada, Ltd., Saskatoon (CA)

(72) Inventors: Ka Po Catherine Hui, Saskatoon (CA); Martin J. Roberge, Saskatoon (CA); Dennis George Thompson, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 64 days.

(21) Appl. No.: 15/661,170

(22) Filed: Jul. 27, 2017

(65) Prior Publication Data
US 2018/0035613 A1 Feb. 8, 2018

Related U.S. Application Data (60) Provisional application No. 62/371,564, filed on Aug. 5, 2016.

(51) Int. Cl.
| | |
|---|---|
| *A01F 12/44* | (2006.01) |
| *A01C 7/08* | (2006.01) |
| *A01C 15/04* | (2006.01) |
| *F04D 17/16* | (2006.01) |
| *F04D 29/42* | (2006.01) |
| *F04D 29/62* | (2006.01) |
| *F04D 25/08* | (2006.01) |
| *F04D 29/28* | (2006.01) |

(52) U.S. Cl.
CPC ........... *A01F 12/444* (2013.01); *A01C 7/081* (2013.01); *A01C 15/04* (2013.01); *F04D 17/16* (2013.01); *F04D 29/4226* (2013.01); *F04D 29/626* (2013.01); *F04D 25/08* (2013.01); *F04D 29/281* (2013.01)

(58) Field of Classification Search
CPC .. F04D 29/4226; F04D 29/626; F04D 17/162; F04D 29/4233; F04D 25/166; F04D 17/16; F04D 25/08; F04D 29/281; A01F 12/444; A01C 15/04; A01C 7/081
See application file for complete search history.

(56) References Cited

U.S. PATENT DOCUMENTS

| | | | | |
|---|---|---|---|---|
| 4,997,342 A | * | 3/1991 | Conger, IV | F04D 29/601 415/200 |
| 5,141,397 A | * | 8/1992 | Sullivan | F04D 29/4233 285/319 |

(Continued)

*Primary Examiner* — Arpad Fabian-Kovacs
(74) *Attorney, Agent, or Firm* — Rebecca L. Henkel; Rickard K. DeMille (57) ABSTRACT

An airflow system that has a fan spacer within a fan assembly is provided for use with equipment such as work vehicles, which may include agricultural implements or other agricultural equipment. The fan spacer influences a width dimension of a fan housing interior and airflow characteristics of the fan assembly, such as output pressure and flow rate, to optimize fan performance for a particular implementation. In this way, the fan spacer allows for highly customizable fan performances by using housing spacers to modify fan housing dimensions and provide performance characteristics that correspond to what is needed for particular implementations while using common fan housing segments.

20 Claims, 7 Drawing Sheets

(56) References Cited

U.S. PATENT DOCUMENTS

| | | | | | |
|---|---|---|---|---|---|
| 5,257,904 | A | * | 11/1993 | Sullivan | F04D 29/4233 403/11 |
| 5,281,092 | A | * | 1/1994 | Sullivan | F04D 29/626 415/206 |
| 6,386,123 | B1 | * | 5/2002 | Gatley, Jr. | F04D 29/4226 110/162 |
| 8,286,798 | B2 | * | 10/2012 | Ricketts | A01D 45/028 209/138 |
| 2004/0096339 | A1 | * | 5/2004 | Bamberger | F04D 25/082 417/350 |
| 2005/0191174 | A1 | * | 9/2005 | Zeng | F04D 17/025 415/206 |
| 2009/0124309 | A1 | * | 5/2009 | Redekop | A01D 45/02 460/100 |
| 2010/0044468 | A1 | * | 2/2010 | Granger | F04D 25/02 239/304 |
| 2010/0247316 | A1 | * | 9/2010 | Aynsley | F04D 29/34 416/189 |
| 2011/0194930 | A1 | * | 8/2011 | Ai | F04D 25/0613 415/182.1 |
| 2013/0101449 | A1 | * | 4/2013 | Dickinson | F04D 17/162 417/423.7 |
| 2013/0101451 | A1 | * | 4/2013 | Dickinson | F04D 25/0613 417/423.7 |
| 2016/0115965 | A1 | * | 4/2016 | Park | F04D 29/4226 415/212.1 |

\* cited by examiner

AIRFLOW SYSTEM WITH FAN SPACER FOR WORK VEHICLES

CROSS-REFERENCE TO RELATED APPLICATIONS

This is a non-provisional application based upon U.S. provisional patent application Ser. No. 62/371,564, titled "Airflow System with Fan Spacer for Agricultural Equipment" filed Aug. 5, 2016, which is incorporated herein by reference.

FIELD OF THE INVENTION

The invention relates generally to airflow systems of work vehicles, which may include agricultural equipment such as implements or other agricultural equipment and, in particular, to a fan spacer.

BACKGROUND OF THE INVENTION

It is known that pneumatic systems are used for performing various functions in work vehicles such as agricultural equipment. Fans are commonly used for providing pressurized airflow(s) that perform such pneumatic functions. In agricultural equipment, airflow from fans can perform various conveyance functions, like entraining seeds, fertilizers, and/or other granular material for pneumatically conveying the granular material through an implement for delivery onto a field. These implementations include seeders, planters, and applicators such as floaters. Airflow from fans can also perform various product cleaning functions, like pneumatically separating or cleaning debris or MOG (material other than grain) from grain. These implementations include various harvesting implements, such as combines and cotton pickers. However, different implementations have different pneumatic power and/or other airflow characteristic requirements, output pressure, and flow rate.

Fan performance is rated by the fan's output pressure and flow rate, so fan ratings can be used to select a suitable fan for a particular implementation. The fan rating and, correspondingly, a fan's output pressure and flow rate are dependent on the geometry of the fan's various components. Known principles or Fan Laws provide that pressure output can be increased as a function of increased fan diameter or speed, and flow rate output can be increased as a function of increased fan width and/or diameter and/or speed. Primary components of a fan include an impeller and a housing, both of which would need to be scaled up to achieve a higher flow rate(s), if needed for a particular implementation.

However, fan housings can be complex, typically having scroll shapes that make them difficult and costly to manufacture. In efforts to reduce production costs and simplify the manufacturing processes, many industrial fan housings, such as those typically used in agricultural implements, are made by casting procedures, sometimes cast as multiple pieces or two halves. However, casting procedures require high capital investments in tooling and production facilities. The tooling required for casting industrial fans is not only expensive to initially make, but is not easily modified. Accordingly, industrial fans tend to be available in a somewhat limited variety of sizes, configurations, and fan performances. This can mean settling for compromises in fan performance(s), based on available configurations.

SUMMARY OF THE INVENTION

A fan spacer is provided that allows for highly customizable fan performances by using housing spacers to modify fan housing dimensions to provide performance characteristics that correspond to what is needed for particular implementations of an airflow system. Accordingly, fan assemblies can be scaled up or otherwise modified without requiring new tooling or tooling modification for the fan housing(s). This also allows several sizes of fans having different flow rate outputs to be offered to customers (e.g. standard fan, high capacity fan), using a common fan housing for the entire family of the fans to provide a variety of options and fan outputs with a nominal amount of additional inventory.

According to one aspect of the invention, a modular housing spacer could to be added to each fan housing to widen it, as required. Thus, a single mold can be tooled for the fan size with the highest sale volume, and the other lower volume fans could use the identical housing coupled with housing spacer(s).

According to another aspect of the invention, a fan spacer of a fan assembly within an airflow system is provided that influences a width dimension of a fan housing interior and, correspondingly, airflow characteristics of the fan assembly, such as output pressure and flow rate, to optimize fan performance for a particular implementation.

According to another aspect of the invention, the spacer may include modular housing spacers of different widths that can be selected to optimize the airflow capacity of a fan used in a particular agricultural implement. This may be done by varying the width of a fan housing by interchanging the different width housing spacers to vary the width of a fan housing for increasing or optimizing the fan performance to correspond to a particular airflow performance need(s) for a particular agricultural implement.

According to another aspect of the invention, if a wider fan housing is required, a housing spacer is mounted between the housing segments or pieces without changing the design of the housing pieces themselves. The geometry of each of the housing pieces stays the same, but the overall housing width is increased as a function of width of the housing spacer. When the fan housing is made in halves with only two pieces, then the spacer may be installed between the housing halves. When the fan housing is made with a different number of segments or pieces, such as more than two housing pieces, then the spacer may be installed between various housing pieces, for example, between an adjacent pair or by installing multiple spacers between multiple pairs of the housing pieces, to widen an overall wall-section of the fan housing.

According to another aspect of the invention, flow rate of the fan assembly is increased by installing a wider impeller to match, which may include exactly matching or nearly matching the width of the housing, or otherwise correspond to the increase in overall housing width of the fan housing.

According to another aspect of the invention, flow rate of the fan assembly is increased only a nominal amount, but flow distribution within the fan housing is improved by way of at least one relatively thin housing spacer and without installing a wider impeller. Flow distribution through the fan housing may be improved by moving the impeller away from the inside housing surface(s) of the fan housing, which helps to reduce boundary effects imposed by the close proximity of the impeller to the inside housing surface(s).

According to another aspect of the invention, impeller spacers and/or offset mounting plates may be implemented to (re)locate the impeller laterally inside the housing when housing spacers are added between the fan housing halves to ensure optimum positioning of the impeller relative to other components of the fan assembly.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
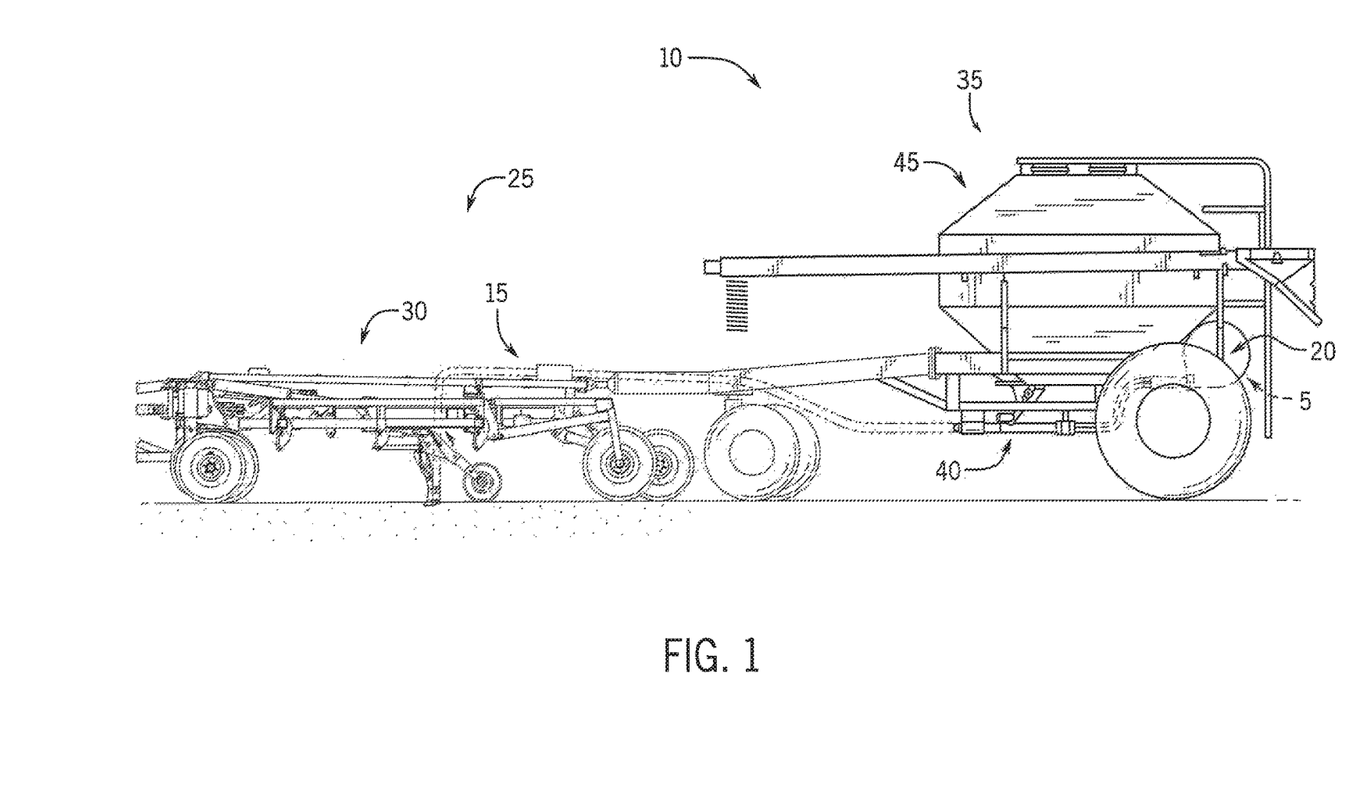
FIG. 1 is a side elevation view of an airflow system with a fan spacer used with a piece of agricultural equipment as a work vehicle.
Figure 2:
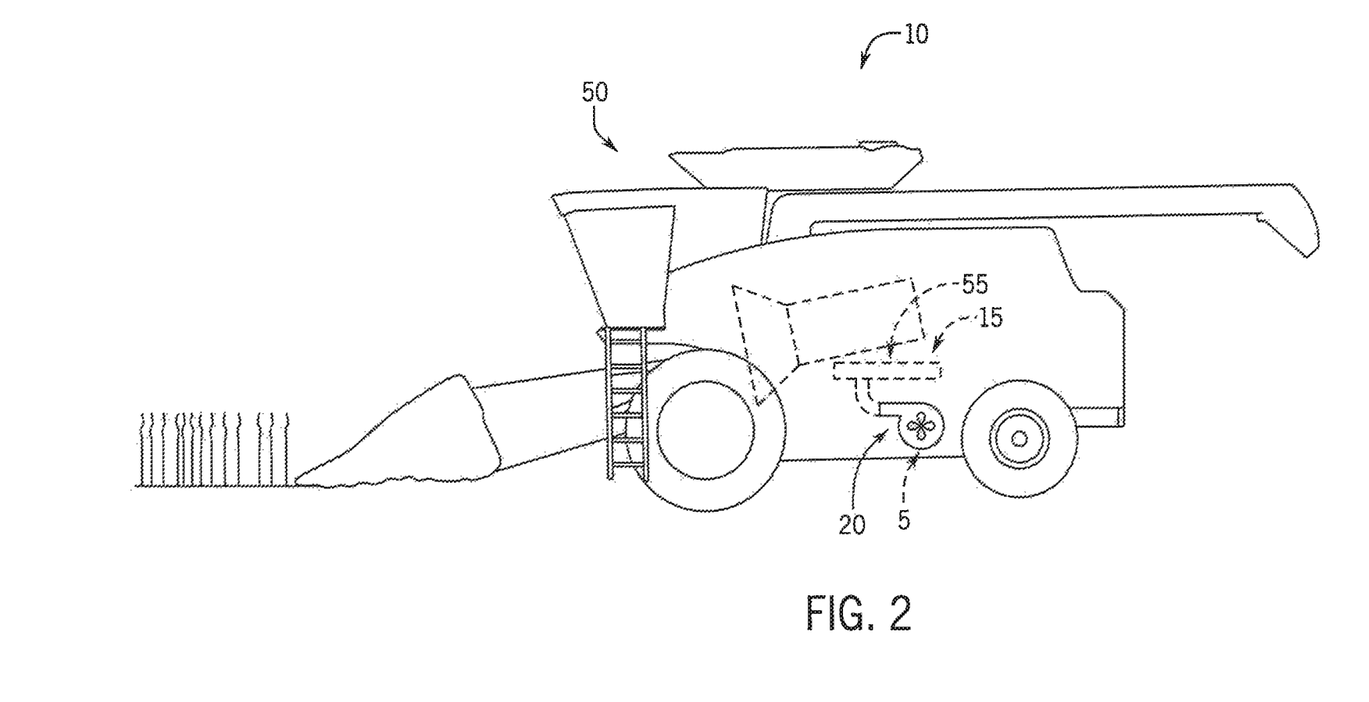
FIG. 2 is a side elevation view of an airflow system with a fan spacer used with another piece of agricultural equipment as a work vehicle.

Referring now to the drawings and specifically to FIGS. 1 and 2, an airflow system with a fan spacer 5, explained in greater detail elsewhere herein, is shown implemented in a work vehicle or piece of equipment. Each of FIGS. 1 and 2 show the work vehicle as a piece of agricultural equipment 10, although it is understood that the airflow system with the fan spacer may be incorporated in other types of work vehicles. Each piece of agricultural equipment 10 includes the airflow system, which may be defined by a pneumatic system such as an air-assisted product delivery and/or cleaning system 15 and fan system 20 that is configured to provide an airflow to air-assisted product delivery and/or cleaning system 15. Referring now to FIG. 1, the piece of agricultural equipment 10 is shown as an air seeder 25 with air drill 30. In this implementation, the air-assisted product delivery and/or cleaning system 15 defines a product delivery or conveyance system 40 that is configured to pneumatically convey granular product such as seeds or fertilizer from a bulk storage system 45 of air cart 35 to air drill 30 for release into the soil. Referring now to FIG. 2, the piece of agricultural equipment 10 may be a harvester such as a cotton picker, or combine, shown here as combine 50. In this implementation, the air-assisted product delivery and/or cleaning 15 defines a product cleaning system 55 that is configured to pneumatically separate debris or MOG (material other than grain) from grain.

Figure 3:
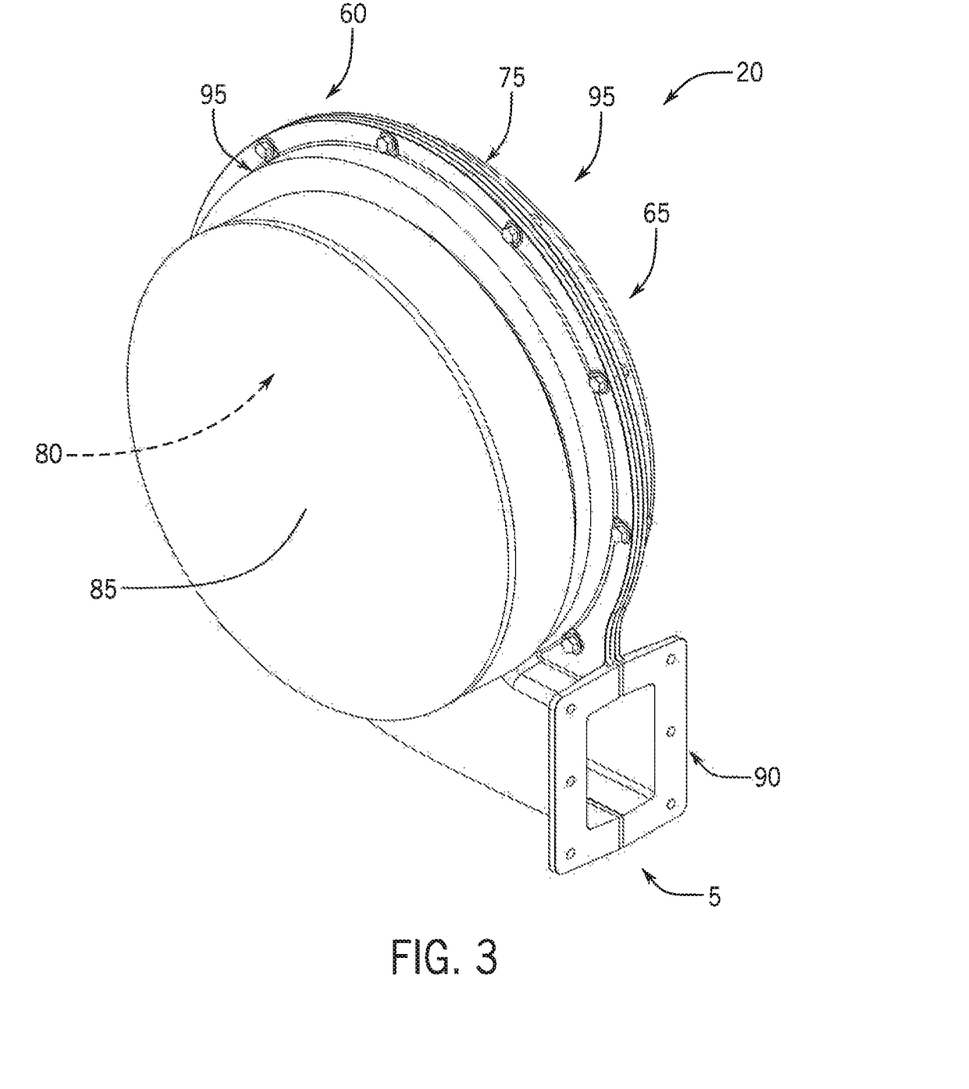
FIG. 3 is a pictorial view of a fan system incorporating a fan spacer.
Figure 4:
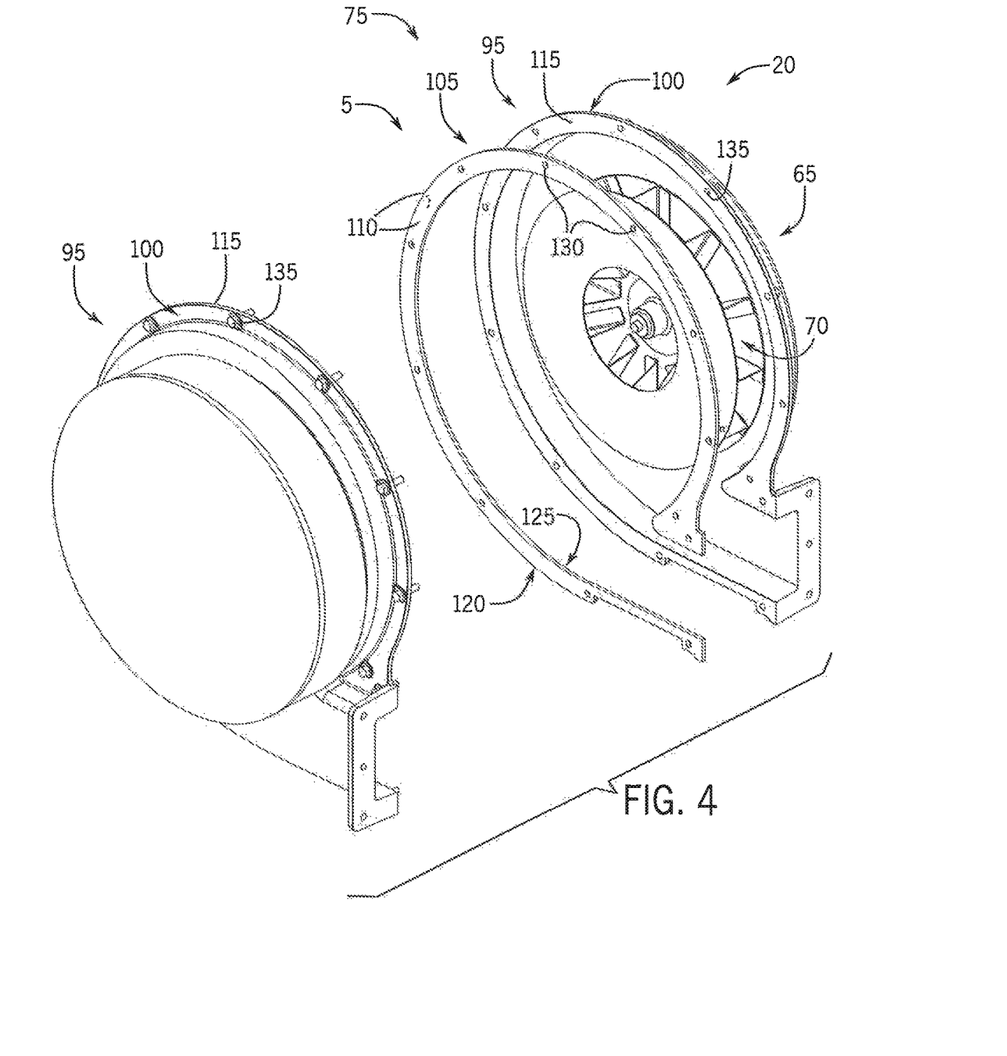
FIG. 4 in an exploded pictorial view of the fan system of FIG. 3.

Referring now to FIG. 3, fan system 20 includes fan assembly 60 that has fan drive 65 and impeller 70 (FIG. 4) that is driven to rotate by fan drive 65 within fan housing 75. A defined space inside of fan housing 75, which is known as fan housing interior 80, houses impeller 70 (FIG. 4) is housed. Fan housing 75 has inlet 85 that is a passage directing air into the fan housing interior 80, as pulled into the fan housing interior by rotation of the impeller 70 (FIG. 4). The rotation of impeller 70 (FIG. 4) pressurizes air within fan housing interior 80, which forces the pressurized air out of outlet 90. Fan housing 75 includes a pair of housing segments 95, which may be arranged at and define first and second sides of the fan housing 75, such that the first and second fan housing segments 95 respectively overlie first and second portions of impeller 70 (FIG. 4).

Still referring to FIG. 3, fan spacer 5 is arranged between the pair of fan housing segments 95, which influences or therefore changes the width dimension of fan housing 75 and fan housing interior 80, compared to if the fan spacer 5 was not used. In this way, implementing fan spacer 5 between fan housing segments 95 makes the fan housing 75 wider and provides an adjusted width dimension of the fan housing 75 by allowing the housing segments to mount in a transversely spaced relationship with respect to each other. The adjusted width dimension of fan housing 75 is greater than its unadjusted width dimension, which is defined when the fan housing has no intervening spacer 5 between its fan housing segments 95 and the fan housing 75 defines a non-spaced state. A difference between the unadjusted and adjusted width dimensions of fan housing 75 may correspond to the width dimension of fan spacer 5. This allows fan spacer 5 to define an intermediate fan housing segment, which facilitates adjusting overall fan housing widths by implementing different numbers or configurations of fan spacer(s) 5.

Referring now to FIG. 4, fan housing segment flanges 100 face each other and are separated by fan spacer 5. Fan spacer 5 is shown here as spacer plate 105 that has a generally rectangular cross-sectional profile. Spacer plate 105 is generally annular and has a pair of outwardly facing surfaces 110 that respectively engage inwardly-facing surfaces 115 of the fan housing segment flanges 100. Spacer plate 105 has outer and inner surfaces shown as outer and inner circumferential surfaces 120, 125. Fan housing and spacer inner perimeters or inner surfaces may match each other so that inner circumferential surface 125 has substantially the same perimeter shape and dimensions as inner surfaces of the pair of fan housing segments 95 to present a substantially continuous inner surface of fan housing 75. It is understood that the inner surfaces of spacer plate 105 and fan housing segments 95 may not be perfectly planar or horizontal when viewed in cross-section, for example, there will likely be small drafts, tapers, or various imperfections in these components as part of the casting for cast components. However, any minor differences between inner perimeter shapes of the fan housing segments and fan spacer will not disrupt airflow within the fan housing 75 beyond a nominal amount, such as less than about 1% of fan output compared to a theoretical value if the fan housing 75, itself, had the adjusted dimensions without using fan spacer 5. Plate bores 130 are spaced from each other and extend through the entire thickness of spacer plate 105. Plate bores 130 align with flange bores 135 of fan housing segment flanges 100. Fasteners (not shown) pass through plate and flange bores 130, 135 to clamp the fan housing segment flanges 100 and spacer plate 105 in a stack against each other.

Figure 5:
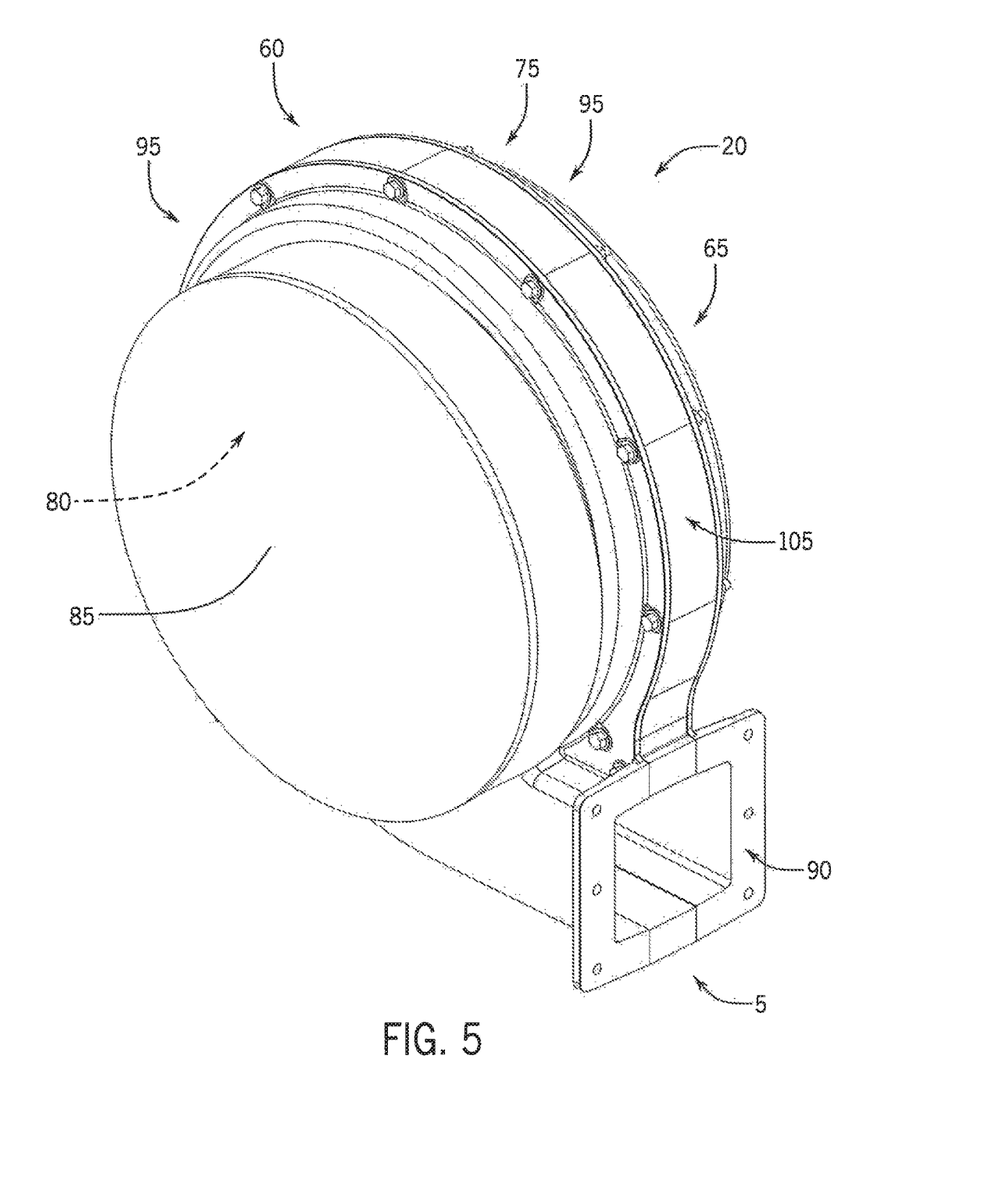
FIG. 5 is a pictorial view of a fan system with a variant of the fan spacer of FIG. 2.

Referring now to FIG. 5, spacer plate 105 is substantially the same as that shown in FIGS. 3 and 4, whereby the description of spacer plate 105 in FIGS. 3 and 4 is applicable here with respect to FIG. 5. Spacer plate 105 in FIG. 5 is thicker than that shown in FIGS. 3 and 4 and, therefore, provides a greater dimensional change to widen fan housing 75 and fan housing interior 80.

Figure 6:
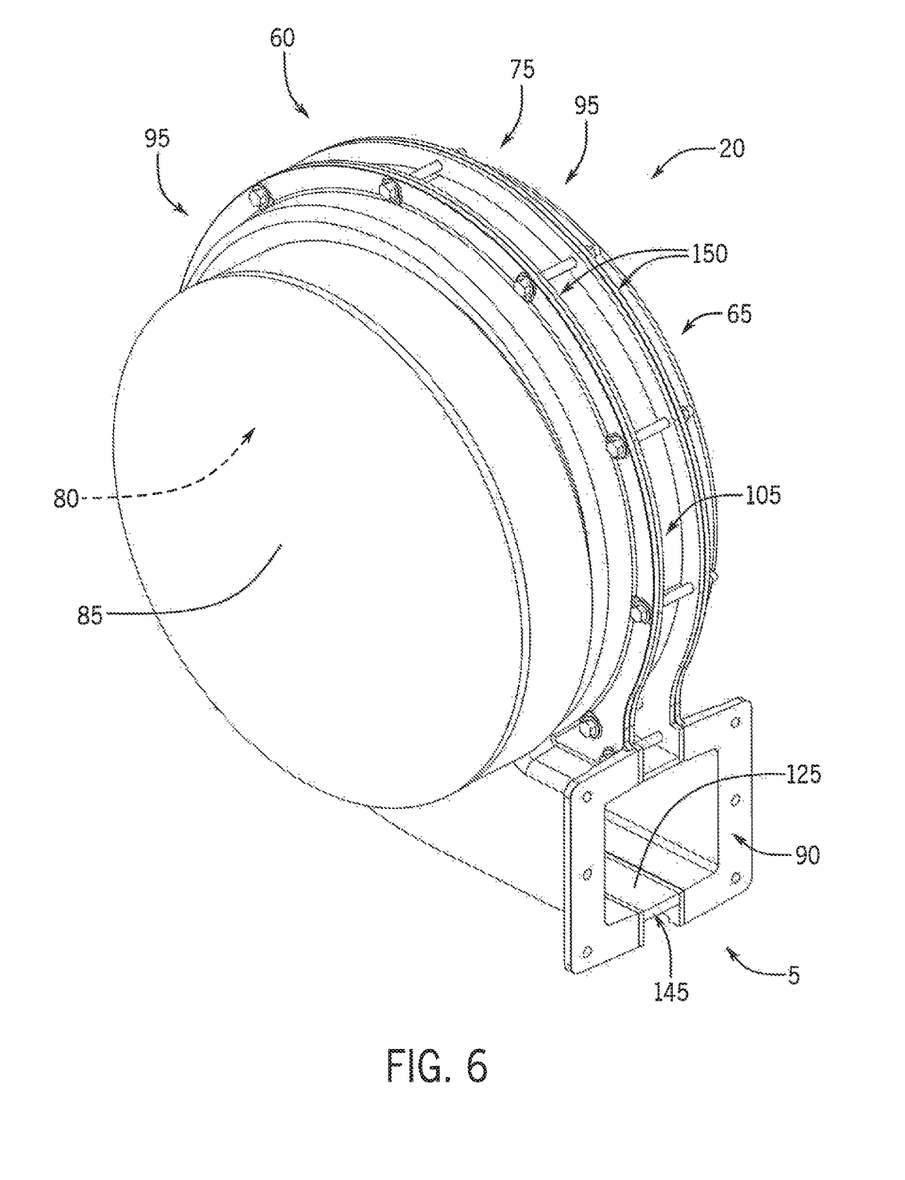
FIG. 6 is a pictorial view of a fan system with another variant of the fan spacer of FIG. 2.
Figure 7:
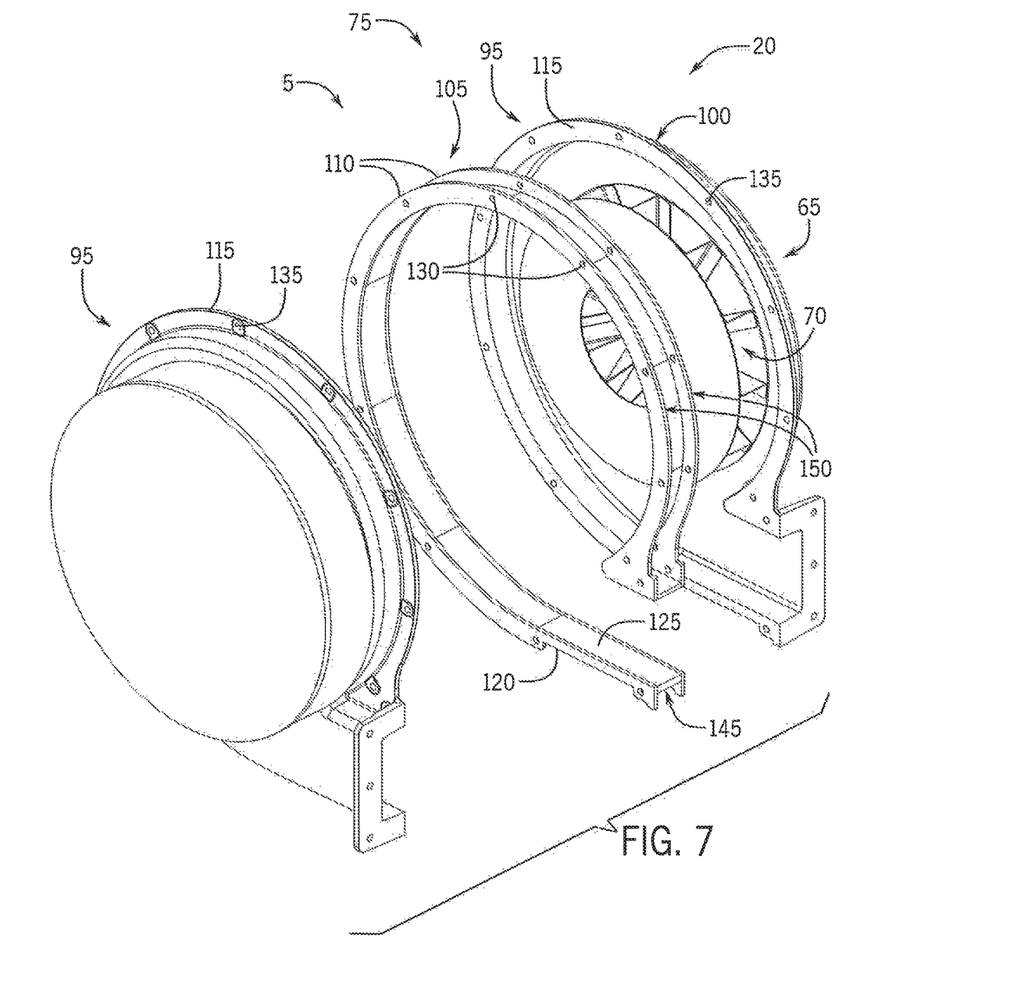
FIG. 7 in an exploded pictorial view of the fan system of FIG. 6.

Referring now to FIGS. 6 and 7, spacer plate 105 differs from those shown in FIGS. 3-5 in that it has a generally U-shaped cross-sectional profile instead of a generally rectangular cross-sectional profile. Spacer plate 105 shown in FIGS. 6 and 7 includes bottom wall 145 and a pair of spacer flanges 150 that extend upwardly from bottom wall 145. Bottom wall 145 is shown in FIGS. 6 and 7 as a three-dimensional surface or structure from which flanges 150 are connected to and extend, whereas inner circumferential surface 125 may define a two-dimensional scroll shape of the wall that faces generally inwardly. Collectively, the spacer flanges 150 and bottom wall 145 define the generally U-shaped cross-sectional profile of spacer plate 105. It is again understood that for cast versions of components such as spacer plate 105, small drafts, tapers, or various imperfections may be embodied in these components as part of the casting process.

With general reference to FIGS. 3-7, it is appreciated that spacer plate 105 may be configured as a flat plate, a weldment, or a separate cast piece with or without mounting flanges. It is also possible to use one spacer plate 105 at a time or stack several together to achieve the desired thickness, as long as the spacer plates 105 and the fan housing segments 95 are properly aligned with each other. Spacer plate(s) 105 can be assembled to fan housing segments 95 by fasteners, welds, rivets, clamps, glue, tapes or other methods as long as the pieces are joined together securely to withstand suitably vibration and high pressures experienced during use. Sealing gasket or silicone or other sealing compound can be used in-between the mating surfaces of the spacer plate(s) 105 and fan housing segments 95 to prevent air leakage. The spacer plate 105 is configured to follow the shape of fan housing 75 and extend or increase the width to create the necessary housing dimension(s) to achieve desired airflow performance. Interlocking grooves can be added on fan housing 75 and/or spacer plate 105 to facilitate proper alignment. Spacer plate 105 can be from a metallic material, such as steel, cast aluminum, or cast iron, but it can alternatively be made from rubber, plastic, or other materials commonly used to construct fan housings, so long as it can withstand suitably vibration and high pressures experienced during use. For implementations in which space is limited or thin, a silicone or other rubber or elastomeric type of material may be used, which allows the spacer plate 105 to both change the dimension(s) of fan housing 75 and serve as a sealing gasket at the same time.

It is further appreciated that an airflow characteristic of fan assembly 60 (FIGS. 1 and 2) can be changed or selected to correspond to airflow system requirements of different agricultural implements. To set up a fan assembly 60 for use with a first agricultural implement 10 (FIGS. 1 and 2) having a first airflow requirement(s), a first housing spacer plate 105 can be installed between a pair of fan housing segments 95 to modify the dimensions of fan housing interior 80. An impeller 70 that is sized for the modified dimensions from the incorporation of the first housing spacer plate 105 can be installed in the fan assembly 60. To set up a fan assembly 60 for use with a second agricultural implement 10 (FIGS. 1 and 2) having a second airflow requirement(s), a second housing spacer plate 105 can be installed between a pair of fan housing segments 95 to modify the dimensions of fan housing interior 80, while an impeller 70 that is sized for the modified dimensions from the incorporation of the second housing spacer plate 105 can be installed in the fan assembly 60. It is further understood that a single piece of agricultural equipment 10 may have multiple fan assemblies 60 with different widths of overall wall-sections of their respective fan housings 75, by way of using fan spacers 5 of different widths in what would otherwise be identical fan housings 75, to provide different fan outputs to meet requirements of different sections on the agricultural equipment 10.

Many changes and modifications could be made to the invention without departing from the spirit thereof. The scope of these changes will become apparent from the appended claims.

We claim:

1. An airflow system of a work vehicle, the airflow system comprising:
    an air assist system;
    a fan system configured to provide an airflow to the air assist system, the fan system including a fan assembly comprising:
        a fan drive;
        an impeller driven to rotate by the fan drive;
        a fan housing that surrounds a space inside of the fan housing to define a fan housing interior with the impeller arranged for rotation within the fan housing interior, the fan housing including:
            an inlet for directing air into the fan housing interior as pulled into the fan housing interior by rotation of the impeller;
            an outlet for directing air out of the fan housing interior as pushed out of the fan housing interior by rotation of the impeller;
            at least first and second housing segments, the at least first and second housing segments including:
                a first fan housing segment of the at least first and second housing segments overlies a first portion of the impeller; and
                a second fan housing segment of the at least first and second housing segments overlies a second portion of the impeller; and
            at least one fan spacer arranged between respective ones of the at least first and second housing segments for influencing a width dimension of the fan housing interior and airflow characteristics of the fan assembly;
    wherein:
        the at least one fan spacer is defined by spacer plate having first and second ends adjacent to the outlet of the fan housing;
        the spacer plate extends about the fan housing interior; and
        the spacer plate is free of a supporting structure interconnecting first and second portions of the spacer plate at locations between the first and second ends thereof.

2. The airflow system of claim 1, wherein each at least two of the at least first and second fan housing segments includes a flange and the at least one fan spacer is sandwiched between the flanges of the at least two of the at least first and second fan housing segments.

3. The airflow system of claim 2, wherein the spacer plate has a generally rectangular cross-sectional profile.

4. The airflow system of claim 2, wherein the spacer plate has a generally U-shaped cross-sectional profile.

5. The airflow system of claim 4, wherein the spacer plate has a bottom wall and pair of flanges that extend upwardly from the bottom wall and are spaced from each other so that the bottom wall and the pair of flanges together define the generally U-shaped cross-sectional profile of the spacer plate.

6. The airflow system of claim 1, wherein the work vehicle is a piece of agricultural equipment and the air assist system is defined by a product conveyance system of the piece of agricultural equipment.

7. The airflow system of claim 6, wherein the piece of agricultural equipment is a seeder, and the product conveyance system is configured to pneumatically convey seeds from a bulk storage system to an air drill for release onto an agricultural field.

8. The airflow system of claim 1, wherein the work vehicle is a piece of agricultural equipment and the air assist system includes a product cleaning system of the piece of agricultural equipment.

9. The airflow system of claim 8, wherein the piece of agricultural equipment is a combine, and the product cleaning system is configured to pneumatically separate MOG (material other than grain) from grain.

10. An airflow system of a piece of agricultural equipment, the airflow system comprising:
a pneumatic system comprising at least one of an air-assisted product delivery to pneumatically convey a product along the piece of agricultural equipment and a cleaning system for pneumatically separating MOG (material other than grain) from grain;
a fan system configured to provide an airflow to the pneumatic system, the fan system including a fan assembly comprising:
a fan drive;
an impeller driven to rotate by the fan drive; and
a fan housing that surrounds a space inside of the fan housing to define a fan housing interior with the impeller arranged for rotation within the fan housing interior, the fan housing including;
an inlet adapted for directing air into the fan housing interior in response to rotation of the impeller;
an outlet adapted for directing air out of the fan housing interior in response to rotation of the impeller;
a first fan housing segment arranged at a first side of the fan housing;
a second fan housing segment arranged at a second side of the fan housing;
wherein the fan housing defines an unadjusted width dimension when the first and second fan housing segments are attached to each other in a non-spaced state of the fan housing; and
a fan spacer arranged between the first and second housing segments to mount the first and second housing segments in a transversely spaced relationship with respect to each other and define a spaced state of the fan housing with an adjusted width of the fan housing that is greater than the unadjusted width dimension of the fan housing;
wherein:
the fan spacer is defined by spacer plate having and second ends adjacent to the outlet of the fan housing;
the spacer plate extends about the fan housing interior; and
the spacer plate is free of a supporting structure interconnecting first and second portions of the spacer plate at locations between the first and second ends thereof.

11. The airflow system of claim 10, wherein the spacer plate has a pair of outwardly facing surfaces that face toward the first and second fan housing segments.

12. The airflow system of claim 11, wherein the fan spacer comprises a stack of spacer plates that is sandwiched between the first and second fan housing segments.

13. The airflow system of claim 10 wherein the spacer plate has a generally rectangular cross-sectional profile.

14. The airflow system of claim 10, wherein the spacer plate has a generally U-shaped cross-sectional profile.

15. The airflow system of claim 14, wherein the spacer plate has a bottom wall and pair of flanges that extend upwardly from the bottom wall and are spaced from each other so that the bottom wall and the pair of flanges together define the generally U-shaped cross-sectional profile of the spacer plate.

16. The airflow system of claim 10, wherein the fan housing defines a fan housing inner surface and the fan spacer defines a fan spacer inner surface, and wherein the fan spacer inner surface corresponds to the fan housing inner surface.

17. An airflow system of a piece of agricultural equipment to perform an air-assisted task on the piece of agricultural equipment including at least one of air-assisted product delivery and pneumatically separating MOG (material other than grain) from grain, the airflow system comprising:
a fan system configured to provide an airflow to the pneumatic system; the fan system including a fan assembly comprising:
a fan drive;
an impeller driven to rotate by the fan drive;
a fan housing surrounding the impeller and defining a fan housing interior with the impeller arranged for rotation within the fan housing interior, the fan housing including;
an inlet adapted for directing air into the fan housing interior in response to rotation of the impeller;
an outlet adapted for directing air into the fan housing interior in response to rotation of the impeller;
a first fan housing segment defining a first side of the fan housing;
a second fan housing segment defining a second side of the fan housing; and
a fan spacer defining an intermediate fan housing segment arranged between the first and second fan housing segments to define an adjusted width dimension of the fan housing;
wherein:
the fan spacer is defined by spacer plate having first and second ends adjacent to the outlet of the fan housing;
the spacer plate extends about the fan housing interior; and
the space plater is free of a supporting structure interconnecting first and second portions of the spacer plate at locations between the first and second ends thereof.

18. The airflow system of claim 17, wherein each of the first and second fan housing segments defines a fan housing inner surface and the fan spacer defines a fan spacer inner surface that corresponds to the fan housing inner surface to collectively present a substantially continuous inner surface.

19. The airflow system of claim 18 wherein the spacer plate has a generally rectangular cross-sectional profile.

20. The airflow system of claim 18, wherein the spacer plate has a generally U-shaped cross-sectional profile.

* * * * *